United States Patent
Akerberg

Patent Number: 5,150,362
Date of Patent: Sep. 22, 1992

[54] BEACON CARRIER

[75] Inventor: Dag E. Åkerburg, Järfälla, Sweden

[73] Assignee: Telefonaktiebolaget L M Ericsson, Stockholm, Sweden

[21] Appl. No.: 578,249

[22] Filed: Sep. 6, 1990

[30] Foreign Application Priority Data

Sep. 13, 1989 [SE] Sweden ............................ 8903030

[51] Int. Cl.$^5$ ................................ H04J 3/16
[52] U.S. Cl. ..................... 370/95.100; 340/825.440; 340/825.100; 455/33; 455/58; 379/60
[58] Field of Search .................... 370/95.1, 104.1; 379/59, 60, 62, 63; 340/825, 441, 825.10; 455/33, 32, 56, 54, 34, 58

[56] References Cited

U.S. PATENT DOCUMENTS

| | | | |
|---|---|---|---|
| 4,360,927 | 11/1982 | Bowen et al. | 455/34 |
| 4,392,242 | 7/1983 | Kai | 455/33 |
| 4,738,780 | 11/1988 | Alexis | 370/95 |
| 4,905,301 | 2/1990 | Krolopp et al. | 455/34 |
| 4,914,649 | 4/1990 | Schuendeman et al. | 370/95.1 |
| 4,940,970 | 7/1990 | Sojka | 455/34 |
| 4,949,395 | 8/1990 | Rydbeck | 455/33 |
| 4,972,506 | 11/1990 | Waldenfeldt | 455/33 |
| 5,008,953 | 4/1991 | Dablin et al. | 370/95.1 |

Primary Examiner—Douglas W. Olms
Assistant Examiner—Dang F. Ton
Attorney, Agent, or Firm—Burns, Doane, Swecker & Mathis

[57] ABSTRACT

In a cellular mobile radio system a method of choosing at a mobile station an appropriate base station and time slot on a time division multiplexed radio channel for the purpose of call set up or handover, wherein each base station transmits in one time slot of a predetermined control radio channel and, at least once during a multi-frame, in each communication radio channel time slot used by the base station for calls, roaming signals comprising information on identity of transmitting base station and communication radio channels available at transmitting base station, the mobile scanning the control and communication channels and when desirous of call set up or handover selecting a base station and a time slot on a communication channel, the mobile desirous of call set up or handover transmitting to the choosen base information on mobile identity and the choosen communication channel time slot.

6 Claims, 5 Drawing Sheets

MSC = MOBILE SWITCHING CENTER

BEACON CARRIER

TECHNICAL FIELD OF INVENTION

This invention relates to mobile radio communication systems comprising plural base and mobile station and time division multiplexed radio channels utilizing dynamic channel allocation. In particular the invention relates to a method for choosing at a mobile station an appropriate base station and time slot on a time division multiplexed radio channel for the purpose of call set up or handover.

BACKGROUND OF THE INVENTION

Mobile radio communication systems may be used for various kinds of communication. Depending upon intended major use and required services many more or less different mobile radio communication systems have been suggested or are in operation.

When mobile radio communication systems may have a large number of base and mobile stations efficient use of radio frequency spectrum and traffic handling capacity become very important. Kinds of communication and services provided and the ability to establish and uphold an established connection are also important.

Some cellular mobile radio systems use cell patterns and radio channel reuse rules with fixed allocation of radio channels to individual cells and serving base stations. To improve flexibility of some cellular mobile radio system it has been suggested not to allocate all available radio channels to individual cells and base stations according to a fixed cell pattern and reuse rule but to allocate some of the avilable radio channels differently from time to time. Depending on traffic load as well as other circumstances some of the channels are individually allocated to individual cells and base stations for a limited time. It has also been suggested not to allocate any available radio channels permanently to individual cells or base stations but to allocate all available radio channels one by one according to prevailing traffic conditions to base stations.

In mobile radio communication systems using time division multiplexed radio channels not only radio channel but also time slot should be determined for each call at set up and handover. In some systems the decision on radio channel and time slot is more or less centralized and done in the fixed part of the system, e.g. in base station or mobile switching centre. In other systems the decisions are decentralized and each mobile station decides which base station, radio channel and time slot to be used for a particular call.

In a cellular mobile radio system with many base stations and many mobile stations it is important to have procedures enabling the system to keep track of mobile stations, choose base stations and select radio channels for calls in a convenient way. This is important irrespective of whether the cellular mobile radio system is intended to be used for speech communication only or primarily or if the cellular mobile radio system is intended to be used for transmission of data only or mostly. However, due to different fields of use, number of base and mobile stations, allocation of channels and performance requirements a roaming or handover procedure very convenient in one cellular mobile radio system may not be particularly convenient in an other cellular mobile radio system.

One aspect of roaming, call set up and handover procedures to consider is the distribution of procedure work load between mobile stations, base stations and the rest of the system, e.g. mobile switching centers. Some known roaming and handover procedures require comparatively much work by base stations and comparatively little work by mobile stations. In other known roaming and handover procedures the work load on base stations is comparatively low but the work load on mobile stations is comparatively high.

Another aspect of procedures to consider is the amount of signalling required on the radio channels between base and mobile stations and the amount of signalling required in the rest of the system, e.g. between base stations and mobile switching centre, e.g. for the purpose of roaming or handover. Some cellular mobile radio communication systems may be able to handle comparatively large amount of such signalling conveniently whereas for other cellular mobile radio systems a large amount of such signalling could be detrimental for the overall performance.

A further aspect of procedures to consider is the limited power available at some mobile stations, in particular small light-weight battery powered portable stations. Normally a mobile station consumes comparatively much power when transmitting radio signals and substantially less power when receiving radio signals. A portable station may be designed to consume very little power when switched on but neither transmitting nor receiving radio signals. In order not to consume more energy than necessary it has been suggested that mobile stations may be in an idle state when not involved in an ongoing call or setting up a call. In the idle state a mobile station may be unable to transmit and receive radio signals during a major part of a repeated time interval and be able to receive but not transmit radio signals only during a minor part of the repeated time interval. The average power consumption may be reduced when the minor time interval is reduced in relation to the major time interval. If the portable station shall be able to perform necessary roaming in the idle state the minor time interval may not be made smaller than necessary to receive radio signals required for roaming. If small light-weight battery powered portable stations shall be frequently used in a mobile radio communication system it is important that procedures for roaming and set up of calls take into account the restriction caused by necessary power consumption of such stations and allow idle states. Portable stations may be rapidly moved when in idle state and the procedures must allow quick roaming and call set up even at mobile stations in an idle state.

SUMMARY OF THE INVENTION

A major object of the present invention is to provide a method of choosing appropriate base station, radio channel and time slot allowing mobile stations not involved in an ongoing call or set up of call to be in an idle state of low average power consumption and yet quickly and independently choose, should the need arise.

A further major object of the present invention is to provide a method enabling decentralized quick change of base station and radio channel time slot in response to quick changes of radio signal propagation and environment.

Another object of the present invention is to provide a method of choosing base station, radio channel and time slot in a cellular mobile radio system where mobile radio stations may access common time multiplex radio channels for the purpose of handover or setting up a call initiated at mobile station or after receiving paging message from a base station.

Still another object of the present invention is to provide a method of choosing base station and time slot on radio channel requiring comparatively little individual radio channel signalling between base and mobile stations for the purpose of handover and call set up and yet provide good ability to traffic load sharing between adjacent base stations.

Yet another object of the present invention is to provide a method where the major part of the intelligent work load for choosing appropriate base station, radio channel and time slot for a call is shared by the mobile stations but a minor part of the intelligent work load is shared by base stations.

Greatly simplified the invention could be considered to be based on the concept of transmitting roaming information both from all base stations on a common control radio channel and from each base station in those time slots of a communication channel used by that base station for a call. Any mobile station scans the common control radio channel for receiving roaming signals from base stations. If no satisfactory roaming signals are received on the common control channel the mobile stations scans communication channels. A mobile station in idle state may scan radio channels only during a small part of the time in idle state.

According to a preferred embodiment the roaming information transmitted in a time slot of a communication radio channel comprises base station identity and communication radio channels available at transmitting base station. The roaming information transmitted in a time slot of the communication radio channel is more exhaustive and comprises base station identity, communication radio channels available at transmitting base station, time slots on available radio channels unused by transmitting base station and the order in which transmitting base station scans available communication radio channels.

Accordingly to another preferred embodiment of a roaming method according to the invention the control radio channel is scanned at each base station for the purpose of receiving roaming signals transmitted by other base stations. At each base station the time of receiving roaming signals from other base stations is compared with the time of transmitting its own roaming signals in relation to the time slots of the control channel. The time of transmission of future roaming signals is adjusted at each base station in view of the result of the comparison.

A method according to the invention affords several advantages. The method is well suited to portable stations in an idle state receiving radio signals only during a small fraction of time in idle state. Mobile stations may rapidly and independently choose a base station and time slot at call set up and decide to change them at handover. The amount of signalling between base and individual mobile stations and the rest of the system is comparatively low. The amount of intelligent work to be perfomed by the base stations is comparatively low and does not increase substantially with increasing number of served mobile stations. The roaming is well suited to load sharing by automatically diverting a mobile station from an overloaded base station without any free time slot to adjacent base stations.

Other objects of the invention as well as advantages provided by a base station and channel choosing method according to the invention will be apparent to those skilled in the art after studying the detailed descriptions of preferred embodiments and the accompanying drawings.

DETAILED DESCRIPTION OF PREFERRED EMBODIMENTS

Embodiments of the invention will be described implemented in a particular mobile radio communication system. The invention is not restricted to this particular system but may be implemented in somewhat different systems.

Figure 1:
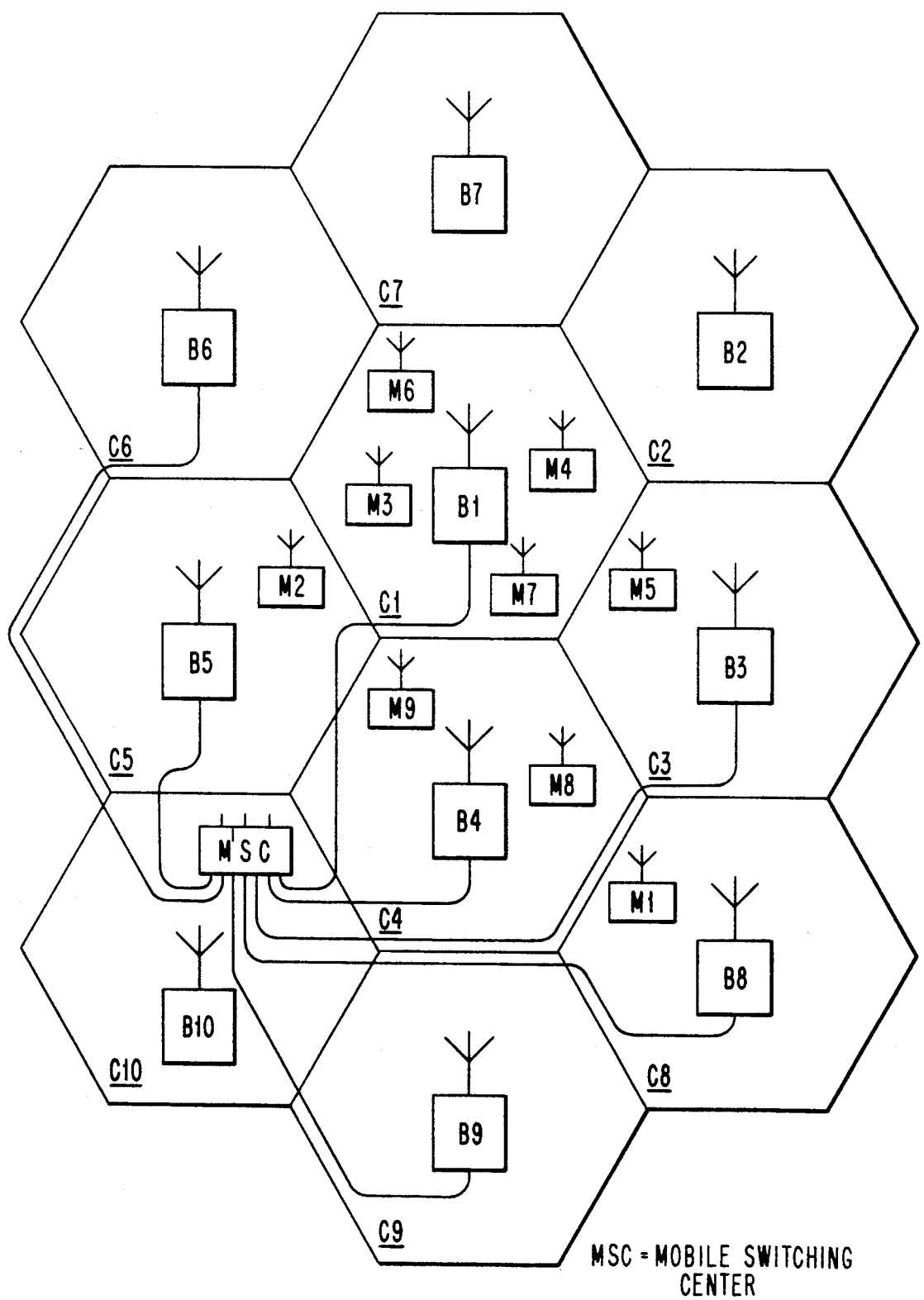
FIG. 1 illustrates a cellular mobile radio system.

FIG. 1 illustrates ten cells C1 to C10 in a cellular mobile radio system. For each cell C1 to C10 there is a base station with the same number as the cell. FIG. 1 also illustrates ten mobile stations M1 to M10 movable within a cell and from one cell to another cell. The invention may be implemented in a cellular mobile radio system comprising more than ten base stations and ten mobile stations. In particular the mobile stations are normally many times as many as the base stations.

Also illustrated in FIG. 1 is a mobile switching centre MSC connected to all ten illustrated base stations by cables. The mobile switching centre may be connected by cables also to a fixed public switching telephone network or similar fixed private network. All cables from the switching centre are not illustrated.

Figure 2:
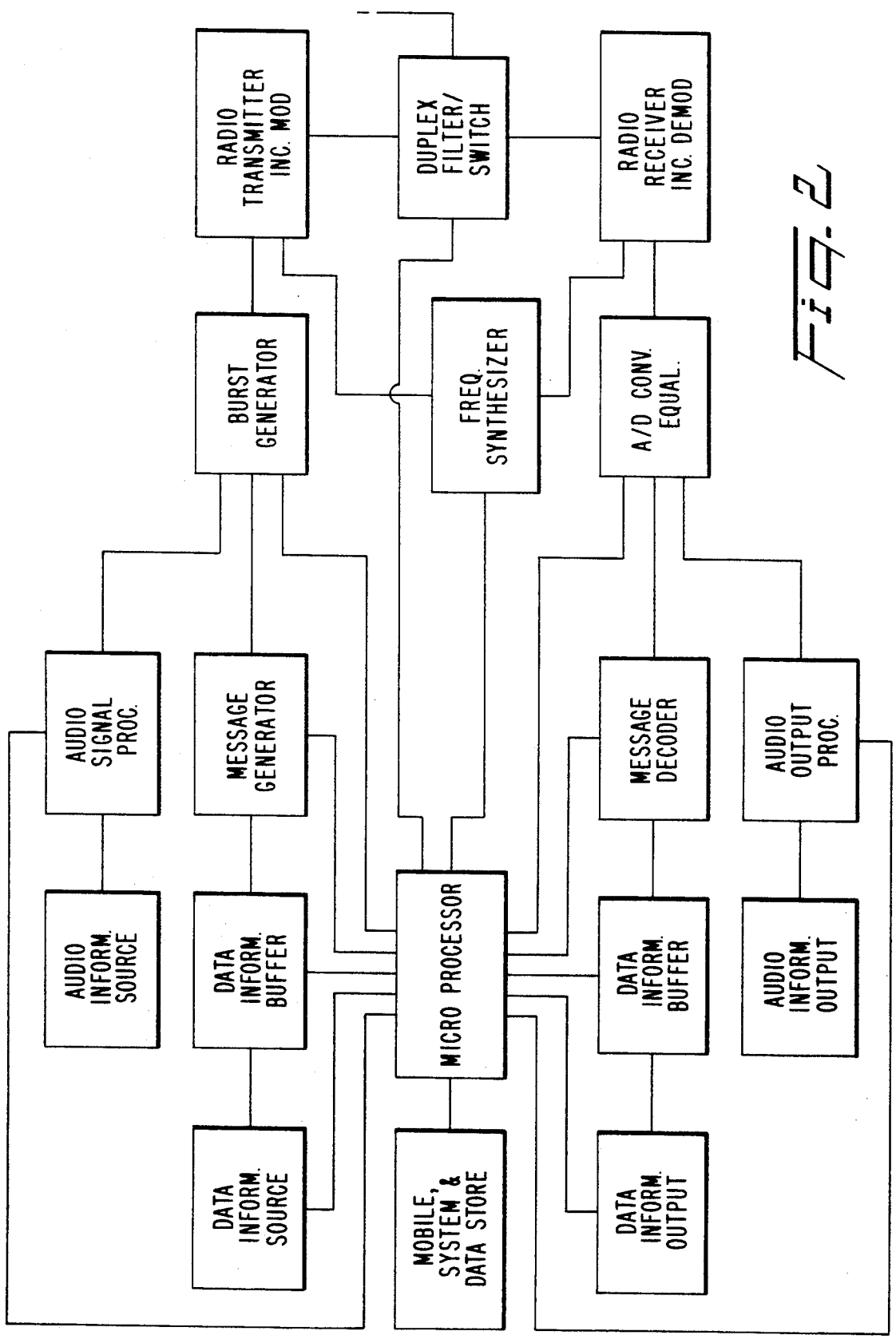
FIG. 2 illustrates a block diagram of a mobile station.
Figure 3:
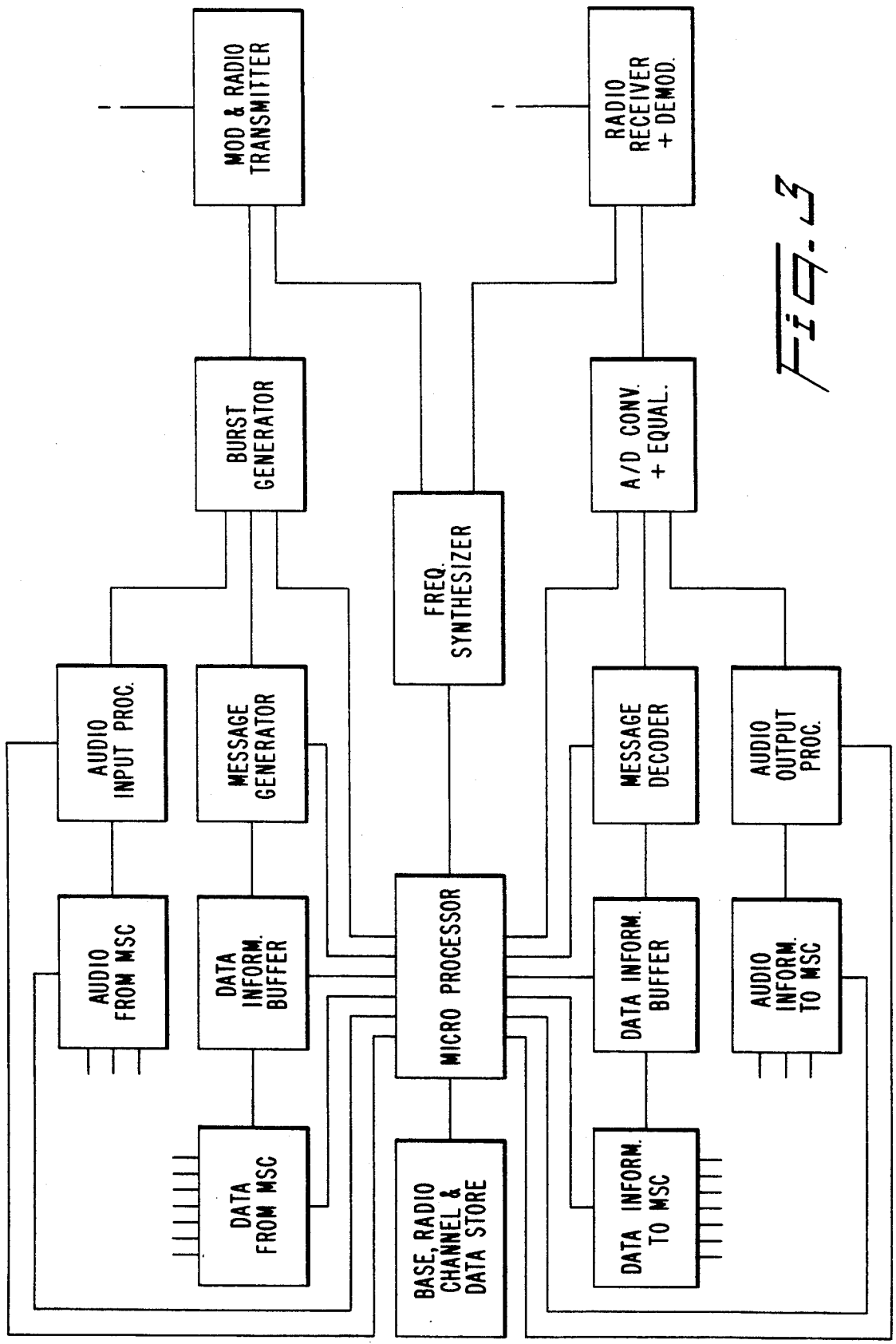
FIG. 3 illustrates a block diagram of a base station.

FIG. 2 illustrates a block diagram of a mobile station and FIG. 3 illustrates a block diagram of a base station for use in a cellular mobile radio system according to FIG. 1 in connection with a method according to the present invention. The mobile station is designed for transmission of bursts in time slots of a selected communication radio channel that may be shared by plural stations in time multiplex and for receiving bursts transmitted by base stations in such time slots. The time slots may be used e.g. for only a normal full duplex telephone call or only digital message communication or both. The base station is designed for transmission of bursts in such time slots but also for simultaneous transmission in time slots of a common control radio channel. Although a base station normally comprises means enabling it to simultaneous communication on more than one communication radio channel in addition to the common control radio channel only means for communication on one radio channel is illustrated in FIG. 3.

Both base and mobile station comprise a micro processor controlled radio transmitter (including modulator) and a microprocessor controlled radio receiver (including demodulator). The radio transmitter transmits radio signals modulated with digital signals from a burst generator. The burst comprises either audio signals from an audio signal processor or digital messages generated by a message generator or both. In the mobile the audio signal processor is connected to an audio information source, e.g. a microphone, while the message generator is connected to a data information source, e.g. a keyboard, via a data information buffer.

In the base the audio processor is instead connected to an audio line terminal receiving audio information from the MSC to which the audio terminal is connected by fixed cables or telephone lines, while the message generator via a data information buffer is connected to a data line terminal receiving data from the MSC to which the data line terminal is connected by fixed cables or telephone lines.

The radio receiver of base and mobile is connected to an analog to digital converter and an optional equalizer. The analog to digital converter and optional equalizer are connected to a message decoder for detecting messages in received bursts and to an audio output processor for audio information in received bursts.

In the mobile the message decoder is connected to a data information output means, e.g. a display, via a data information buffer, while the audio output processor is connected to an audio information output means, e.g. a loud-speaker.

In the base the message decoder is instead connected via a data information buffer to a data line terminal supplying data to the MSC to which the data terminal is connected by fixed telephone lines or cables, while the audio output processor is connected to an audio line terminal supplying audio information to the MSC to which the audio line terminal is connected by fixed telephone lines or cables.

The radio channel on which the base or mobile radio transmitters and receivers operate is detemined by frequencies supplied from a frequency sythesizer controlled by the microprocessor. Finally the base and mobile comprises data store means for storing information on the particular base and mobile station, radio channels, frame and time slot format, message formats, error protecting codes, algorithms for operation of station etc.

The microprocessor is connected to the store and almost all blocks for controlling and timing their operation, for supplying information, e.g. from the store, to be incorporated in bursts to be transmitted, and for receiving information form received bursts, e.g. for control purpose or for storing in the store.

The mobile system illustrated in FIG. 1 comprises one control radio channel common to all base stations and a plurality of other radio channels for communication. No radio channels are exclusively reserved for one particular base station but all communication radio channels are a common resource to be used by base stations according to prevailing traffic. For reasons of economy not all base stations may have an many radio transmitters as the number of radio channels in the system. Accordingly not all communication radio channels are available simultaneously at some base stations.

Figure 4A:
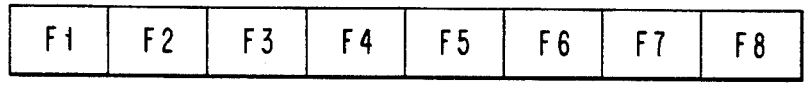
FIGS. 4a–4f illustrate time slots, frames and a multiframe and transmission of signals comprising roaming information from a base station in a time slot on a communication radio channel used by the transmitting base station for a calls.
Figure 4B:
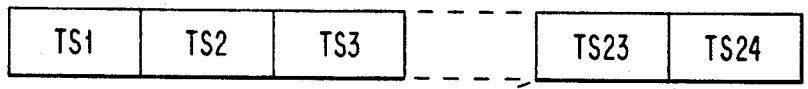

The communication radio channels of the system are time division multiple access channels with frames F comprising 24 time slots TS1-TS24 as represented in FIG. 4b; twelve of which are used for transmission in the direction from base to mobile station and twelwe for transmission in the direction from mobile to base station. The frames of a channel are grouped in multiframes with eight frames F1-F8 in each multiframe as shown in FIG. 4a.

A base station may use one or more or all time slots on a communication radio channel for calls involving mobile stations served by the base station. A base station may also use time slots on more than one communication radio channel for calls involving mobile stations served by the base station. Base stations sufficiently distant from each other may use the same time slot(s) on the same communication radio channel(s) for different calls.

Figure 4C:
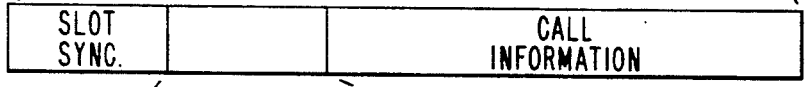

Each base station not involved in any call uses one time slot on one communication radio channel for a dummy call. Accordingly each base station uses at least one time slot on at least one communication radio channel, as shown for example in FIG. 4c''; calls involving a mobile station or a dummy call.

In a time slot on a communication radio channel a base station may transmit radio signals comprising not only time slot synchronization and the actual information of the call, e.g. speech, but also other information. Such other information may be different in different frames of a multiframe.

Figure 4D:
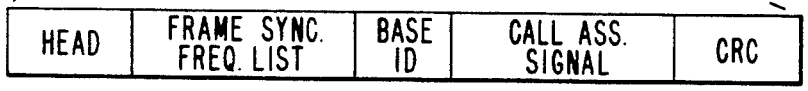

In at least one frame of a multiframe the base station may transmit roaming information as shown for example in FIG. 4d comprising type of message, frame and multiframe synchronization, list of communication radio channels available at the base station, base station identity and type of service available. Some call associated information may sometimes be transmitted in the same time slots as the roaming information. The information is digitally encoded in an error protecting coding comprising check bits CRC.

Figure 4E:

Instead of roaming information the base station may transmit paging information together with the time slot synchronization and actual information of the call in a time slot of a frame in a multiframe. The paging information, as shown in FIG. 4e comprises message type, identity of paged mobile stations and check bits CRC of an error protective code.

Figure 4F:

Instead of roaming or paging information a base station may use a time slot of a frame of a multiframe for transmitting call associated information together with the time slot synchronization and actual information of the call as shown in FIG. 4f. In addition to the call associated information message type and check bits CRC are transmitted.

The common control radio channel of the system as represented in FIG. 5 is a time division multiplex channel with frames comprising 24 time slots T1-T23 (FIG. 5b), all of which could be used for transmission in the direction from base to mobile station. The frames of the common control radio channel are grouped in multiframes, each comprising eight frames F1-F8 as shown in FIG. 5a.

Each base station transmits in one of the 24 time slots on the control radio channel. When the system comprises more than 24 base stations two or more base stations sufficiently distant from each other may transmit in the same time slot of the control radio channels.

Allotting of time slots of the control radio channel to individual base stations may be done in various ways in order to meet various requirement on system performance. To reduce interference adjacent base stations are normally allotted different time slots.

Figure 5A:
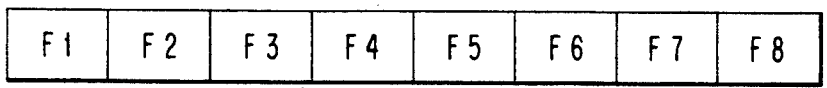
FIGS. 5a–5e illustrate time slots, frames and a multiframe and transmission of roaming signals from a base station on a common time division multiple access control radio channel.
Figure 5B:
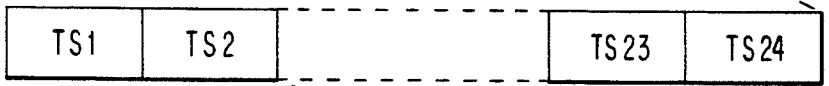
Figure 5C:

A base station may use its time slot on the common control radio channel as shown in FIG. 5c both for transmitting roaming signals and for transmitting paging signals. Roaming signals and paging signals are then transmitted in different frames of a multiframe.

Figure 5D:
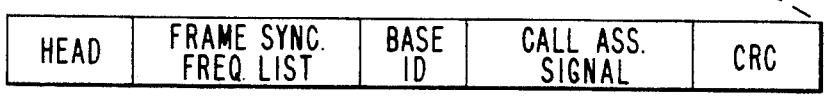

When a base station uses its time slot in a frame of a multiframe for the purpose of roaming as shown in FIG. 5d; the signals transmitted in the time slot comprise time slot synchronization, message type, frame and multiframe synchronization, list of communication radio channels available at the base station, the order in which base station scans available radio channels, base station identity, type of available service at transmitting base station and list of unused time slots on available communication channels. Thus the roaming signals transmitted on the common control radio channel are more exhaustive as far as channel information is concerned than the roaming signals transmitted on a communication radio channel. The information of the time slot is digitally encoded in an error protection coding comprising check bits CRC.

Figure 5E:

When a base station uses its time slot in a frame of a multiframe for the purpose of paging as shown in FIG. 5d and FIG. 5e, the signals transmitted in the time slot comprises time slot synchronization, message type and identity of paged mobile stations. The information is digitally encoded in an error protecting code comprising check bits CRC.

In the mobile radio communication system described the mobile stations independently choose base station, communication radio channel and time slot for a call at call set up and handover. The choice is made according to predetermined rules and based on information available at the mobile stations. Many rules based on various information including signal strength and noise ratios are known to those skilled in the art. Some rules also take traffic load and mobile position etc into consideration. A method according to the present invention is not restricted to any particular prior art rule or any particular available information. Accordingly there is no need to describe any particular prior art rule for base and channel time slot selection.

Each mobile station stores information on base stations, communication radio channels, time slots etc in a store. Information to be stored is collected from radio signals transmitted from base stations. In order to receive radio signals each mobile station scans at least the control radio channel and sometimes also communication radio channels. The scanning may be more or less different depending upon the type of mobile station and if the station is in an idle state without a call in progress or to be set up or if the mobile station is in a traffic state with an ongoing call or a call to be set up.

The fixed part of the communication system in FIG. 1 does not know the location of mobile stations not involved in an ongoing call or the setting up or termination of a call. Paging is broadcasted by all base stations of the system on all communication channels presently used and the choice of channel and time slot for communication is done by the mobile station. A mobile station without contact with the system must therefore first find an appropriate base station belonging to the system. However there may be another mobile communication system with overlapping geographical area using the same radio channels. Furthermore the base stations of the same system may use different radio channels. Finding an appropriate base station belonging to the same system is simplified by the existence of the control radio channel on which all base stations transmit in a time slot.

A mobile station without contact with the system e.g. after power switched on or after entering the geographical area of the system, scans the control radio channel. Scanning of one frame is normally sufficient for getting information on a lot of base stations and their available channels. The mobile station normally selects the base station transmitting the strongest useful radio signals and enters into idle mode if there is no call to set up. The idle locked mode means that the mobile station is synchronized to a base station and receives its paging at least once every multiframe.

Without the existence of a control radio channel or when no useful radio signals are received on the control radio channel a mobile station without contact with its system has to scan all possible radio channels to find the base station of the same system transmitting the strongest useful radio signals.

A mobile station in idle state may be paged. A mobile station in idle state uses the paging signals of the chosen base station. When there is a control radio channel with useful radio signals the mobile station in idle state scans the time slot of the chosen base station on the control radio channel for receiving paging signals. Paging signals are only transmitted in the time slots of the first frame of a multiframe. It is therefore quite sufficient to scan up to the header of one time slot in one frame of a multiframe in order to receive all paging information. This means that only about the first 10-20% of 1 time slot out of 192 need to be scanned.

A mobile station in idle state may be moved and the radio propagation properties and noise and interference may change. The radio signals from one base station may become weaker and less useful while the radio signals from an other base station may become stronger and more useful. In order to be able to choose an appropriate base station when the conditions may change the mobile station in idle state also scans the control radio channel and reconsiders its choice of base station. The mobile station monitors the signals received on the control radio channel and chooses the base station transmitting the strongest radio signals. The mobile station stores at least identity of the chosen base station and communication radio channels available at the chosen base station and time slots unused by the chosen base station according to the roaming signals received on the control radio channel.

In order to save power the mobile station in idle state may scan the control radio channel only periodically. Scanning one frame every 3-30 seconds may be sufficient when conditions are not changing rapidly. If the field strength of the own channel locked to suddenly decreases a scan is immediately initiated.

In order to be prepared for a possible future call set up the idle mobile station may also periodically scan at least the unused time slots of the communication radio channels of the chosen base station and monitor signals in unused time slots in order to detect possible noise or interference from other base stations in time slots unused by the chosen base station. The store is updated by information obtained from radio signals received when scanning.

The mobile station also decodes paging calls from the chosen base station at scanning and checks if they are adressed to the mobile station.

If the mobile station in the idle state cannot receive any satisfactory signals on the control radio channel, e.g. due to interference, the mobile station scans a time slot of the chosen base station on a communication channel in order to receive possible paging signals. In order to be able to reconsider its choice of base station when conditions may change the base station then also has to scan all possible communication radio channels instead of the control channel in order to receive roaming signals and determine which base station transmits the strongest radio signals. If there are many communication radio channels in the system this will normally take much longer time and require much more power.

When a mobile station wants to access a base station because it has been paged or it desires to set up a call it chooses base station, communication radio channel and time slot according to predetermined rules using information stored in its store. Normally the idle mobile station chooses the base station transmitting the strongest radio signals and the unused time slot of the chosen base station having least interference according to the information on radio channels and time slots.

If the mobile station in idle state has not scanned the unused time slots of the chosen base station the mobile station does this after having been paged. An access request message is then transmitted in the chosen mobile-to-base time slot of the chosen communication radio channel to the chosen base station. If the base station receives an appropriate access request message and accepts the choice of the mobile station the base station transmits an access acknowledgement message in the base-to-mobile time slot corresponding to the time slot chosen by the mobile station.

If a mobile station does not receive an access acknowledgement message from the chosen base station in an appropriate time slot of chosen communication radio channel it makes a second choice on the second best combination of base station, communication radio channel and time slot and transmits a new access request message accordingly. Without receiving an appropriate access acknowledgement message the mobile station makes a third choice etc until it receives an appropriate access acknowledgement message or a maximum number of access attempts is reached.

If a mobile station receives an appropriate access acknowledgement message the desired call may be set up according to predetermined procedures not forming part of a method according to this invention.

A mobile station with power supply not imposing restrictions on use of radio receiver and control logic may scan the control radio channel more or less continuously for receiving and decoding roaming signals from different base stations except during time slots used for an ongoing call involving the mobile station. The same is normally due for mobile stations with power restrictions when in the traffic state having an ongoing call because then the power consumption is dominated by the transmission of radio signals for the call. When not scanning the control radio channel the communication channels available may be scanned except during time slot of ongoing call. This extended scanning may reduce the time for handover substantially.

A mobile station in the traffic state having an ongoing call continues to scan the control radio channel regularly typically every second frame, and appropriate communication radio channels regularly, typically every second frame, for the purpose of comparing signal strength of base stations and to update its stored information on available radio channels, unused time slots and noise and interference in time slots. The stored information is used in accordance to predetermined rules to determine at the mobile station if a handover to other base station or radio channel or time slot ought to be done. If handover ought to be done an access request is transmitted to the chosen base station on the chosen communication radio channel and in the choosen mobile-to-base time slot in a similar way as when desiring call set up. If an appropriate access acknowledgement message is received the call is handed over in accordance with procedures not forming part of the method according to this invention. If no appropriate access acknowledgement message is received a new decision on the question of handover is made at the mobile station. If handover is still desired a new access request message is transmitted in a similar way as at set up of a call.

If at a mobile station in a traffic state involved in a call in progress no appropriate roaming signals can be received when scanning the control radio channel the mobile station begins to scan the communication radio channels instead in order to receive roaming signals and determine which base station is transmitting the strongest radio signals received. If there are many communication radio channels in the system this will however take much longer time than scanning only the control radio channel. This will increase the scanning period and may delay a required handover.

A particular advantage of the method according to the invention is the ability to cope with quick changes of radio signal propagation and environment. Scanning one frame of a multiframe takes typically about 10 ms and is sufficient for determining which base station transmits the strongest radio signals, what communication radio channels are available and which time slots on available radio channels or unused by strongest base station. The time intervals between succeeding control radio channel scannings may be in the order of 3-30 seconds in idle mobile stations. In order to determine best time slot of strongest base station only time slots unused on communication channels available according to received roaming signals need to be scanned by idle mobile station. Such scanning may also be done only once every few seconds. Thus very little scanning is necessary to update information on best base station and time slot when they change.

If there is noise or interference on the control radio channel the system will still be operative thanks to the roaming signals in time slots of the communication radio channels.

It may be very difficult for a mobile station to decode and interpret received overlapping radio signals from different base stations on the control radio channel, at least if the strength of overlapping radio signals do not differ sufficiently. Accordingly it is highly desirable that mobile stations scanning the control radio channel receive radio signals from adjacent or neighbour base stations separate from each other. This may be achieved if transmissions from the base stations are sufficiently synchronized so that the radio signals from each base station on the control radio channel are confined in its time slot. This can easily be done by conventional synchronization means if the base stations have direct wire connections or a common wired connection. If not each base station may for this purpose scan the control radio channel for receiving radio signals transmitted by other base stations. Each base station compares the time of receiving radio signals from other base stations with the time of transmitting its own radio signals taking the time slots of the control radio channel into consideration. At least as far as distant base stations are concerned the propagation time of radio signals may be taken into account. If the comparison shows that the base station transmits its radio signals too early or too late in relation to the average of the other base stations the base station automatically changes its time of transmission to be in accordance with the average time of the other base stations. The comparison and change of transmission times may be performed in a way similar to what is disclosed in European Patent Application EP 0286614.

The invention is not restricted to the described embodiment but several amendments to the method are conceivable within the scope of invention.

The amount of roaming information carried by the roaming signals transmitted by a base station in a time slot on the control radio channel may be more or less than in the described embodiment. In general the roaming information is identity of transmitting base station and operation parameters. The roaming information shall always comprise base station identity but the information on operation parameters can be more or less exhaustive. Normally the roaming information in a control radio channel time slot is much more exhaustive than in a communication radio channel. The roaming information may comprise information on available channels at transmitting base station. In addition the roaming information may comprise information on particular order in which the transmitting base station scans available radio channels for receiving access requests from mobile station. In addition the roaming signals may comprise information on which time slots on radio channels available are unused by transmitting base station.

When a base station shall transmit both roaming signals and paging signals on a control radio channel or a communication radio channel both roaming and paging signals may be transmitted in the same time slot in the same frame of a multiframe or in same time slot but in different frames of a multiframe.

The number of time slots of a frame or the number of frames in a multiframe may be different than described. Instead of using the same radio channel both for base-to-mobile transmission and for mobile-to-base transmission pairs of unidirectional radio channels may be utilized.

Having the same frame length on control and communication channels the time slots on the control channel may be half as long but twice as many as those of a communication channel. The duplicated number of time slots may be utilized in various ways. Some base stations in areas with expected low traffic may have only one radio receiver capable of receiving radio signals only on one radio channel at a time. At such a base station the mobile stations may be allowed to transmit access requests on the unused control radio channel time slots.

Alternatively the duplicated number of time slots on the control radio channel may be used to reduce the number of base stations (distant) transmitting in the same control radio channel time slot.

I claim:

1. A method of selecting a base station, radio channel and time slot at a mobile station for call set up or handover in a mobile communication system comprising a plurality of base stations, mobile stations, and time division multiple access radio channels, comprising the steps of:

transmitting from each base station, in each communication radio channel time slot used by the transmitting base station for calls, at least once during a multiframe on the communication channel, roaming signals comprising information on identity of the transmitting base station and communication radio channels available at the transmitting base station;

transmitting from each base station in one time slot of a predetermined control radio channel roaming signals comprising information on identity of the transmitting base station and communication radio channels available at the transmitting base station;

scanning the predetermined control radio channel for receiving satisfactory roaming signals at any mobile station;

scanning communication radio channels available according to received roaming signals for receiving noise and interfering radio signals in time slots unused by the base station at any mobile station desirous of call set up or handover;

storing and updating information on base station identity and available communication radio channels and time slots from radio signals received at any mobile station;

selecting at any mobile station desirous of call set up or handover a base station and a time slot on a communication radio channel for call set up or for handover according to information received in satisfactory roaming signals at the mobile station on the control radio channel and communication radio channel respectively; and transmitting to the selected base station from the mobile base station desirous of call set up or handover radio signals comprising information on mobile station identity, the selected communication radio channel and the time slot selected.

2. A method of selecting a base station, radio channel and time slot at a mobile station for call set up or handover in a mobile communication system comprising a plurality of base stations, mobile stations, and time division multiple access radio channels, comprising the steps of:

transmitting from each base station, at least once during a multiframe in each communication radio channel time slot used by the transmitting base station for calls, roaming signals comprising information on identity of the transmitting base station;

transmitting from each base station in one time slot of a predetermined control radio channel roaming signals comprising information on identity of the transmitting base station, communication radio channels available at the transmitting base station and time slots unused by the transmitting base station;

broadcasting from each base station paging signals on control and communication channels comprising identitiy of any paged mobile stations;

scanning the predetermined control radio channel for receiving satisfactory roaming signals at any mobile station;

scanning communication radio channels for receiving satisfactory roaming signals comprising base station identity at any mobile station where no satisfactory roaming signals are received when scanning the predetermined control radio channel;

storing and updating information on the base station identity and available communication radio channels and time slots from radio signals received at any mobile station;

selecting at any mobile station paged or desirous of call set up or handover a base station and a time slot on a communication radio channel for call set up or for handover according to information received in satisfactory roaming signals at the mobile station on the control radio channel and communication radio channel respectively; and transmitting to the selected base station from the mobile station desirous of call set up or handover radio signals comprising information on the mobile station identity on the selected communication radio channel in the time slot selected.

3. A method of choosing a base station, radio channel and time slot at a mobile station for paging, call set up or handover in a mobile communication system comprising a plurality of base stations, mobile stations and time division multiple access radio channels, comrising the steps of:

transmitting from each base station, at least once during a multiframe in each time slot used by the transmitting base station for calls, roaming signals comprising information on identity of the transmitting base station;

transmitting from each base station in one time slot of a predetermined control radio channel roaming signals comprising information on identity of the transmitting base station, communication radio channels available, and time slots unused at the transmitting base station for selection by a mobile sation;

scanning, at any mobile station in an idle state, the predetermined control radio channel periodically during a part of the time in the idle station for receiving satisfactory roaming signals;

scanning communication radio channels periodically during a part of the time in the idle state for receiving satisfactory roaming signals comprising base station identity at any mobile station in the idle state where no satisfactory roaming signals are received when scanning the predetermined control radio channel;

storing and updating information on base station identity and available communication radio channels and time slots from radio signals received at any mobile station desirous of call set up or handover or in the idle state;

selecting, at any mobile station paged or desirous of call set up or handover, a base station and a time slot on a communication radio channel for call set up or for handover according to information received in satisfactory roaming signals at the mobile station on the control radio channel and communication radio channel respectively; and transmitting, to the selected base station from the mobile station desirous of call set up or handover, radio signals comprising information on mobile station identity on the selected communication radio channel in the time slot selected.

4. A method according to claim 1 comprising the further steps of:

scanning the control radio channel at each base station for receiving roaming signals transmitted by other base stations;

comparing at each base station the time of receiving roaming signals from other base stations on the control radio channel with the time of transmitting its own roaming signals on the control radio channel in relation to the time of transmitting its own roaming signals on the control radio channel in relation to the time slots of the control channel; and adjusting at each base station the time of transmission of roaming signals on the control radio channel in view of the result of the comparison.

5. In a mobile communication systems including a plurality of base stations, mobile stations, and time division multiple access radio channels, a method for selecting a base station, radio channel and time slot at a mobile station for call set up or handover comprising the steps of:

transmitting roaming signals at least one time from each base station including information on identity of the transmitting base station and communication radio channels available at the transmitting base station during a multiframe in each communication radio channel time slot used by the transmitting base station for calls;

transmitting roaming signals from each base station including information on identity of the transmitting base station and communication radio channels available at the transmitting base station in one time slot of a predetermined control radio channel;

scanning the predetermined control radio channel for satisfactory roaming signals to be received at any mobile station;

scanning the communication radio channels for satisfactory roaming signals, said roaming signals including the transmitting base station identity, to be received at any mobile station where no satisfactory roaming signals are received when scanning the predetermined control radio channel;

storing and updating information on base station identity and available communication radio channels from radio channels received at any mobile station;

selecting at any mobile station desirous of call set up or handover a base station and a time slot on a communication radio channel for call set up or handover according to satisfactory roaming signals received at the mobile station on the control radio channel and communication radio channel respectively; and transmitting the mobile station identity, the selected communication channel and the selected time slot to the selected base station from the mobile station.

6. In a mobile communication systems including a plurality of base stations, mobile stations, and time division multiple access radio channels, a method for selecting a base station, radio channel and time slot at a mobile station for call set up or handover comprising the steps of:

transmitting roaming signals at least one time from each base station including information on identity of the transmitting base station and communication radio channels available at the transmitting base station during a multiframe in each communication radio channel time slot used by the transmitting base station for calls;

transmitting roaming signals from each base station including information on identity of the transmitting base station, communication radio channels available at the transmitting base station and time slots unused by the transmitting base station in one time slot of a predetermined control radio channel;

transmitting from the base stations paging signals including identity of any paged mobile stations;

scanning the predetermined control radio channel for satisfactory roaming signals to be received at any mobile station;

scanning the communication radio channels for satisfactory roaming signals, said roaming signals including the transmitting base station identity, to be received at any mobile station where no satisfactory roaming signals are received when scanning the predetermined control radio channel;

storing and updating information on base station identity, available communication radio channels and unused time slots from radio channels received at any mobile station;

selecting at any paged mobile station desirous of call set up or handover a base station and a time slot on a communication radio channel for call set up or handover according to satisfactory roaming signals received at the mobile station on the control radio channel and communication radio channel respectively; and transmitting the mobile station identity on the selected communication channel in the selected time slot to the selected base station from the mobile station.

* * * * *